(12) United States Patent
Prociw et al.

(10) Patent No.: US 10,252,365 B2
(45) Date of Patent: Apr. 9, 2019

(54) DEPOSITION OF BRAZE PREFORM

(71) Applicant: Delavan Inc, West Des Moines, IA (US)

(72) Inventors: Lev Alexander Prociw, Johnston, IA (US); Jason A. Ryon, Carlisle, IA (US); Steven J. Myers, Norwalk, IA (US); Michael J. Bronson, West Des Moines, IA (US); Fouad T. Khairallah, West Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 0 days.

(21) Appl. No.: 15/630,313

(22) Filed: Jun. 22, 2017

(65) Prior Publication Data

US 2017/0282273 A1 Oct. 5, 2017

Related U.S. Application Data

(62) Division of application No. 14/704,579, filed on May 5, 2015, now abandoned.

(51) Int. Cl.
*B23K 1/00* (2006.01)
*B23K 1/20* (2006.01)
(Continued)

(52) U.S. Cl.
CPC .............. *B23K 1/20* (2013.01); *B23K 3/0623* (2013.01); *B23K 3/0638* (2013.01); *B23K 35/0244* (2013.01); *B23K 35/302* (2013.01); *B23K 35/3006* (2013.01); *B23K 35/3013* (2013.01); *B23K 35/3033* (2013.01); *B23K 35/3053* (2013.01); *B23K 35/32* (2013.01); *B23K 35/322* (2013.01)

(58) Field of Classification Search
CPC .... B23K 1/008; B23K 1/0008; B23K 1/0056; B23K 1/19; B23K 35/0244; B23K 26/34; B23K 35/025
See application file for complete search history.

(56) References Cited

U.S. PATENT DOCUMENTS

| 3,222,774 A | * | 12/1965 | Kump | ...................... B23K 1/19 228/75 |
| 2011/0247188 A1 | * | 10/2011 | Van Rooyen | .......... B23K 26/34 29/402.01 |

OTHER PUBLICATIONS

SCM Metal Products, Inc., CuBond CB, Braqzing products for CuproBraze Process, No. 403, May 21, 2003 (Year: 2003).*

(Continued)

*Primary Examiner* — Erin B Saad
(74) *Attorney, Agent, or Firm* — Locke Lord LLP; Scott D. Wofsy; Joshua L. Jones

(57) ABSTRACT

A method of manufacturing includes depositing a braze filler adjacent to a void between a first component and a second component thus holding the components in position before brazing. The first and second components are heated to melt and flow the braze filler into the void. A braze joint is formed between the first and second components by cooling the braze filler. Depositing the braze filler can include laser cladding the braze filler to the first and/or second components adjacent the void. The method also optionally includes welding the first and second components in position with the braze filler adjacent to the void. The braze filler may be deposited as a powder, cold spray, melted brazed filament, spherical ball or any other suitable form.

3 Claims, 2 Drawing Sheets

(51) Int. Cl.
*B23K 3/06* (2006.01)
*B23K 35/02* (2006.01)
*B23K 35/30* (2006.01)
*B23K 35/32* (2006.01)

(56) References Cited

OTHER PUBLICATIONS

Metco, An Introduction to Brazing, Issue 4, Sep. 2014) (Year: 2014).*

* cited by examiner

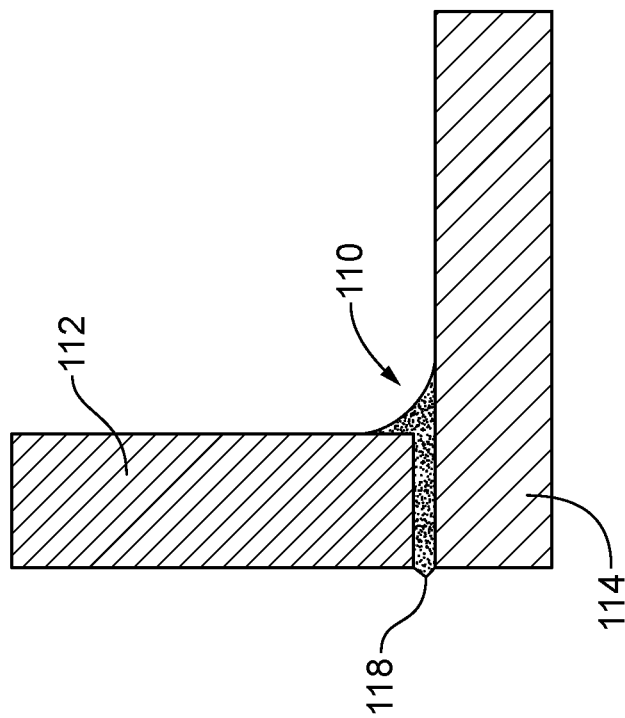
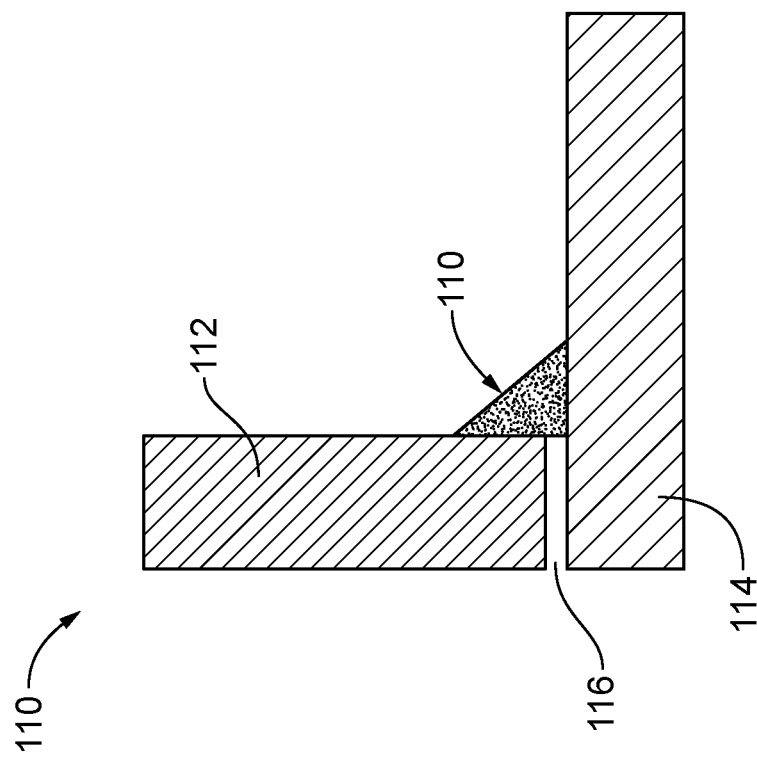

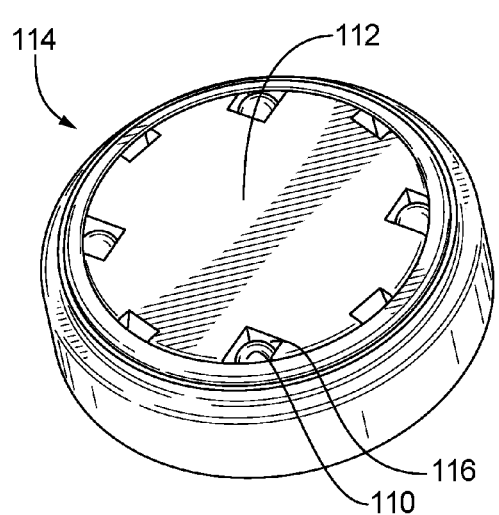
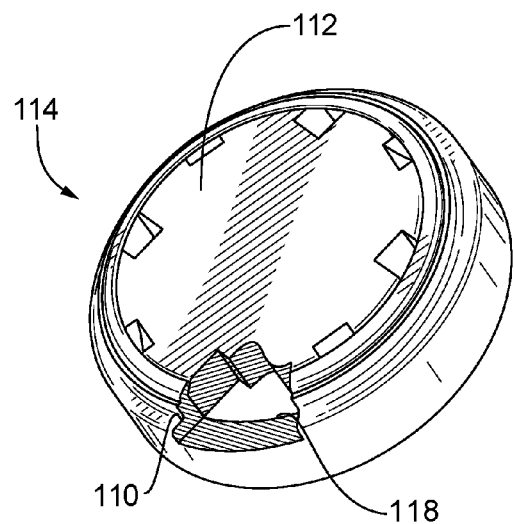
FIG. 3  FIG. 4
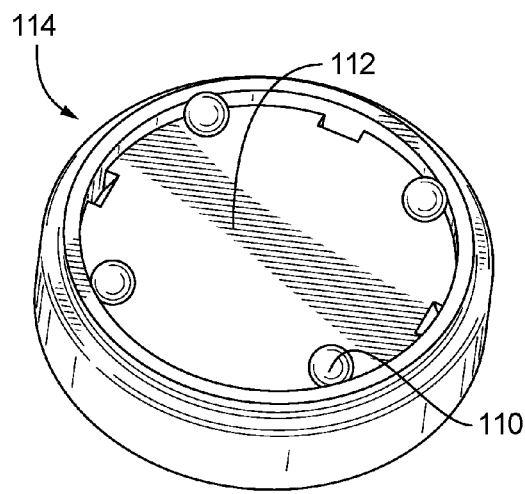
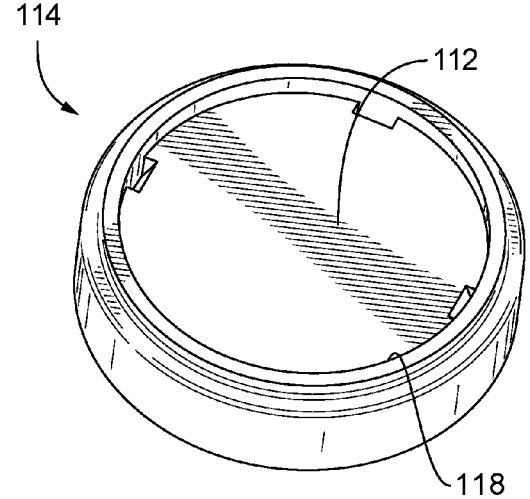
FIG. 5  FIG. 6

DEPOSITION OF BRAZE PREFORM

CROSS-REFERENCE TO RELATED APPLICATION

This application is a divisional of U.S. patent application Ser. No. 14/704,579 filed May 5, 2015, which is incorporated herein by reference in its entirety.

BACKGROUND OF THE INVENTION

1. Field of the Invention

The present disclosure relates to manufacturing and, more particularly, to brazing components during manufacturing.

2. Description of Related Art

Conventional construction of components which undergo high heat during operation, such as fuel injectors, nozzles, atomizers and heat exchangers, include the components bonded together with braze. The components are typically nested within one another or stacked and form a narrow gap which is filled with a braze alloy. Typically, the braze alloy is applied as a braze paste, wire ring, or as a thin sheet shim on the external surfaces or within pockets inside the assembly. Applying braze paste is a very manual process and often can be inconsistent. Braze rings are an improvement but still must be manually positioned and are sensitive to placement. Braze plating requires masking. The use of conventional weld balls for tack welding components for braze fixturing presents the extra process of removal of these weld balls after brazing is complete. All of these challenges can lead to high scrap rates and increased process time. Too little braze creates holes and leakage in the assembly and too much braze results in excess material, e.g., that can block intended fuel or air passages in atomizers and the like. There is a need in the art to more accurately apply a specific amount of braze material to the correct locations. The present disclosure provides a solution for this need.

SUMMARY OF THE INVENTION

A method of manufacturing includes depositing a braze filler adjacent to a void between a first component and a second component thus holding the components in position before brazing. The first and second components are heated to melt the braze filler and draw the braze filler into the void. A braze joint is formed between the first and second components by cooling the braze filler.

Depositing the braze filler can include laser cladding the braze filler to the first and/or second components adjacent the void. The method also optionally includes welding the first and second components in position with the braze filler adjacent to the void. The braze filler may be deposited as a powder, cold spray, melted brazed filament, spherical ball, or any suitable form. The braze material can include at least one material chosen from the group consisting of bronze-based matrix materials containing nickel, steel-based matrix materials containing nickel, and steel alloys containing chromium, nickel, molybdenum, silicon, vanadium, carbon, gold, silver, copper, platinum and/or palladium, or the like.

The method can include depositing the braze filler as a braze ball located and/or tack welded to the first and/or second components. The braze ball can be of a predetermined size. These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an exemplary embodiment of a brazed assembly constructed in accordance with the present disclosure, showing a braze material laser cladded to a first and second component adjacent a void;

FIG. 2 is a schematic view of the braze assembly of FIG. 1, showing the braze material forming a braze joint between the first and second components;

FIG. 3 is a schematic view of another exemplary embodiment of a brazed assembly constructed in accordance with the present disclosure, showing a braze ball crimped into a pocket feature prior to forming a braze joint between the first and second components;

FIG. 4 is a schematic view of the braze assembly of FIG. 3, showing the braze material forming a braze joint between the first and second components;

FIG. 5 is a schematic view of another exemplary embodiment of a brazed assembly constructed in accordance with the present disclosure, showing a preformed braze ball to tack welded in place prior to brazing; and FIG. 6 is a schematic view of the braze assembly of FIG. 5, showing the braze ball consumed between the first and second components to provide a braze joint therebetween.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of a method for manufacturing in accordance with the disclosure is shown in FIG. 1 and is designated generally by reference character 100. Other embodiments of methods of manufacturing in accordance with the disclosure, or aspects thereof, are provided in FIGS. 2-3, as will be described.

With reference to FIGS. 1 and 2 an example of a first component 112 and a second component 114 with a braze filler 110 is shown adjacent a void 116 is shown. First and second components 112, 114 are dimensioned to fit together. For example, first and second components 112, 114 can be nozzle components of a fuel injector. The first and second components 112, 114 are each welded in position with the braze filler 110 laser cladded adjacent the void 116. The components 112, 114 are heated during which the braze 110 melts flows into the void 116. A braze joint 118, as shown in FIG. 2 is formed between the first and second components after the braze 110 is cooled. In other words, first and second components 112, 114 and braze filler 110 are assembled with a laser cladding process prior to heating the components 112, 114 and braze filler 110 to form the braze joint 118. In this manner, the entire assembly, including the first and second components 112, 114 and braze filler, are kept in position to allow the braze filler 110 to melt and flow directly into the void 116 thereby increasing the ability to control the location, amount, and flow of the braze filler 110. Typical brazing techniques rely on capillary forces, etc. to provide a relatively uncontrolled flow of braze through or between components to a desired braze joint location. Thus components formed of typical braze techniques are prone to braze fillets and even braze blockages as well as incomplete sealing of various internal passages from one another. Depositing the braze filler 110 directly adjacent the void 116 prior to heating the components 112, 114 ensures the braze 110 will flow directly into the void 116, precisely where it is intended to flow and thereby avoid the challenges of traditional brazing techniques. The braze material 110 can include at least one material including bronze-based matrix materials containing nickel, steel-based matrix materials containing nickel, and steel alloys containing chromium, nickel, molybdenum, silicon, vanadium, carbon, gold, silver, copper, platinum, palladium, or the like.

The braze material 110 is applied to the first component 112 and/or the second component 114 using laser cladding. The braze material 110 can also be laser cladded to only one of the first component 112 or the second component 114. The non-joined component can be held in position by some other means such as clamping or a jig to maintain the void.

Laser cladding is a process in which an alloy of cladding material (in the form of a wire, powder, etc.) is applied to a surface to permit accurate, consistent application of material. A concentrated laser beam moves relative to the surface to melt the applied alloy and a thin layer of the surface material to form a cladding that is metallurgically bonded. Laser cladding is similar to thermal spraying in that an energy source is used to melt the alloy that is being applied to a substrate. However, unlike thermal spraying, laser cladding also melts a thin layer of the surface that the alloy is being applied to. This process results in a fused metal and strong metallurgical bond between the cladding and the surface the alloy is applied to. Typically, laser cladding results in an interface with superior bond strength over thermal spraying. Since a concentrated laser beam is used as the heat source, the heat affected zone will be minimal. Any suitable known laser cladding process may be used to deposit the braze material to the joint location without departing from the scope of this disclosure.

FIGS. 3 and 4 illustrate another embodiment of the present disclosure where the braze filler is a braze ball 110 that is located into a void 116. In this embodiment, the braze ball 110 is melted into the two structural components 112, 114 to be joined together by a braze joint 118. It will be understood by those skilled in the art the braze is shown as a braze ball for ease of illustration and description, however the braze can be any shape/form that fits within a desired void without departing from the scope of the present invention. FIGS. 5 and 6 illustrate another embodiment of the present disclosure where the braze filler is a braze ball 110 that is used to tack weld and locate the two structural components 112, 114 in place prior to braze operation. In this embodiment, the braze ball 110 is melted into the two structural components 112, 114 to be joined together by a braze joint 118.

As shown in FIGS. 3-6, the components 112, 114 and braze ball 110 are shown as a general assembly. It will be understood by those skilled in the art that the braze ball can be used on any suitable assembly requiring a braze joint, for example, pump motors, fuel assemblies, turbine engines, or the like. This embodiment allows to control the quantity of the braze material by selecting the proper size of the braze ball 110. Further, the proper size of the braze ball 110 allows for additional control over the applied heat quantity based on the operating conditions of the assembly. Thus, the supply of excess heat can be avoided. More specifically, oxidation, discoloration, warping and undesirable stresses are avoided. Due to the precise measuring of the braze material in the form of balls of predetermined size, any waste of braze material is also avoided. As shown in FIG. 3, as the first and second components 112, 114 and braze ball 110 are heated the braze ball 110 melts and flows into void 116 to a braze joint between components 112, 114.

The methods and systems of the present disclosure, as described above and shown in the drawings, provide for a method of manufacturing with superior properties including improved precision in brazing. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of manufacturing, comprising:
    positioning a first component and a second component to form a void between the first component and the second component;
    depositing a braze filler by laser cladding a melted braze filament to the first component and the second component adjacent to the void, the deposited braze filler holding the first and second component in position prior to melting the braze filler;
    heating the first and second components to melt the braze filler and draw the braze filler into the void; and
    forming a braze joint between the first and second components by cooling the braze filler.

2. The method of claim 1, wherein the depositing includes laser cladding braze filler to the first component and clamping the first component to the second component.

3. The method of claim 1, wherein the braze filler includes at least one material chosen from the group consisting of bronze-based matrix materials containing nickel, steel-based matrix materials containing nickel, and steel alloys containing chromium, nickel, molybdenum, silicon, vanadium, carbon, gold, silver, copper, platinum and/or palladium.

* * * * *